(12) United States Patent
Lee et al.

(10) Patent No.: US 8,015,266 B1
(45) Date of Patent: Sep. 6, 2011

(54) SYSTEM AND METHOD FOR PROVIDING PERSISTENT NODE NAMES

(75) Inventors: Herman Lee, Mountain View, CA (US); Arthur F. Lent, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 1254 days.

(21) Appl. No.: 10/360,434

(22) Filed: Feb. 7, 2003

(51) Int. Cl.
G06F 15/177 (2006.01)
G06F 15/173 (2006.01)

(52) U.S. Cl. ........................... 709/220; 709/223
(58) Field of Classification Search ........... 709/227–229, 709/217–223, 216; 714/5
See application file for complete search history.

(56) References Cited

U.S. PATENT DOCUMENTS

| | | | | |
|---|---|---|---|---|
| 4,718,005 A * | 1/1988 | Feigenbaum et al. | ........ | 709/222 |
| 5,163,131 A | 11/1992 | Row et al. | | |
| 5,355,453 A | 10/1994 | Row et al. | | |
| 5,485,579 A | 1/1996 | Hitz et al. | | |
| 5,528,765 A * | 6/1996 | Milligan | ........ | 710/107 |
| 5,596,723 A * | 1/1997 | Romohr | ........ | 709/222 |
| 5,627,967 A * | 5/1997 | Dauerer et al. | ........ | 726/2 |
| 5,802,366 A | 9/1998 | Row et al. | | |
| 5,819,292 A * | 10/1998 | Hitz et al. | ........ | 1/1 |
| 5,931,918 A | 8/1999 | Row et al. | | |
| 5,941,972 A | 8/1999 | Hoese et al. | | |
| 5,963,962 A | 10/1999 | Hitz et al. | | |
| 6,038,570 A | 3/2000 | Hitz et al. | | |
| 6,065,037 A * | 5/2000 | Hitz et al. | ........ | 709/200 |
| 6,105,122 A * | 8/2000 | Muller et al. | ........ | 712/1 |
| 6,119,131 A * | 9/2000 | Cabrera et al. | ........ | 1/1 |
| 6,247,077 B1 * | 6/2001 | Muller et al. | ........ | 710/74 |
| 6,421,684 B1 * | 7/2002 | Cabrera et al. | ........ | 707/200 |
| 6,425,035 B2 | 7/2002 | Hoese et al. | | |
| 6,496,839 B2 * | 12/2002 | Cabrera et al. | ........ | 1/1 |
| 6,701,332 B1 * | 3/2004 | Vella | ........ | 707/204 |
| 6,711,343 B1 * | 3/2004 | Matsumi et al. | ........ | 386/234 |
| 6,715,098 B2 * | 3/2004 | Chen et al. | ........ | 714/3 |
| 6,823,398 B1 * | 11/2004 | Lee et al. | ........ | 710/5 |
| 6,839,747 B1 * | 1/2005 | Blumenau et al. | ........ | 709/223 |
| 6,874,082 B2 * | 3/2005 | Tateyama et al. | ........ | 713/1 |
| 6,957,279 B2 * | 10/2005 | Odenwald et al. | ........ | 710/1 |
| 6,963,938 B2 * | 11/2005 | Suzuki et al. | ........ | 710/104 |
| 6,988,149 B2 * | 1/2006 | Odenwald | ........ | 709/250 |
| 6,996,629 B1 * | 2/2006 | Odenwald | ........ | 709/238 |
| 7,016,299 B2 * | 3/2006 | Kashyap | ........ | 370/218 |
| 7,054,927 B2 * | 5/2006 | Ulrich et al. | ........ | 709/223 |

(Continued)

FOREIGN PATENT DOCUMENTS

JP 04267443 A * 9/1992

OTHER PUBLICATIONS

Maintenance Procedures ND (8C) nd-network disk control Feb. 1985.

(Continued)

*Primary Examiner* — David E England
(74) *Attorney, Agent, or Firm* — Cesari and McKenna, LLP

(57) ABSTRACT

A system and method for providing persistent node names is provided. The system and method stores the node name associated with a given storage system in the root volume associated with the storage system. Thus various components of the storage appliance may be modified without changing the node name associated with a given storage system. This enables clients to have a consistent and persistent node name to connect to in a given network environment.

22 Claims, 5 Drawing Sheets

U.S. PATENT DOCUMENTS

| | | | |
|---|---|---|---|
| 7,062,579 B2 * | 6/2006 | Tateyama et al. | 710/104 |
| 7,099,866 B1 * | 8/2006 | Crosbie et al. | 1/1 |
| 7,117,303 B1 * | 10/2006 | Zayas et al. | 711/112 |
| 7,165,152 B2 * | 1/2007 | Blumenau et al. | 711/152 |
| 7,197,638 B1 * | 3/2007 | Grawrock et al. | 713/165 |
| 7,260,737 B1 | 8/2007 | Lent et al. | |
| 7,281,062 B1 * | 10/2007 | Kuik et al. | 709/249 |
| 7,330,897 B2 * | 2/2008 | Baldwin et al. | 709/229 |
| 7,512,832 B1 * | 3/2009 | Lent et al. | 714/4.11 |
| 7,523,207 B2 * | 4/2009 | Chen et al. | 709/227 |
| 7,689,799 B2 * | 3/2010 | Black | 711/172 |
| 2002/0078335 A1 * | 6/2002 | Cabrera et al. | 713/1 |
| 2002/0083339 A1 * | 6/2002 | Blumenau et al. | 713/201 |
| 2002/0112022 A1 | 8/2002 | Kazar et al. | |
| 2002/0116593 A1 | 8/2002 | Kazar et al. | |
| 2002/0161745 A1 * | 10/2002 | Call | 707/1 |
| 2003/0026254 A1 * | 2/2003 | Sim | 370/392 |
| 2003/0070053 A1 * | 4/2003 | Gallo et al. | 711/170 |
| 2003/0188085 A1 * | 10/2003 | Arakawa et al. | 711/100 |
| 2004/0054777 A1 * | 3/2004 | Ackaouy et al. | 709/225 |
| 2004/0054866 A1 * | 3/2004 | Blumenau et al. | 711/202 |
| 2004/0153479 A1 * | 8/2004 | Mikesell et al. | 707/200 |
| 2004/0221049 A1 * | 11/2004 | Blumenau et al. | 709/229 |
| 2005/0097126 A1 * | 5/2005 | Cabrera et al. | 707/102 |
| 2005/0201380 A1 * | 9/2005 | Saleh et al. | 370/395.2 |
| 2006/0187908 A1 * | 8/2006 | Shimozono et al. | 370/363 |
| 2007/0192444 A1 * | 8/2007 | Ackaouy et al. | 709/219 |
| 2008/0028000 A1 * | 1/2008 | Makismenka et al. | 707/201 |

OTHER PUBLICATIONS

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

U.S. Appl. No. 10/216,453, Rajan et al.

U.S. Appl. No. 10/215,917, Pawlowski et al.

"American National Standard for Information Technology—Fibre Channel—Physical and Signaling Interface (FC-PH)", American National Standards Institute, New York, NY, published 1994, 430 pages.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

NCI TS 332-1999 Fibre Channel Arbitrated Loop (FC-AL-2) published by the American National Standards Institute.

DAFS: Direct Access File System Protocol, Version 1.0 published by the DAFS Collaborative.

ANSI X3.230-1994, Fibre Channel Physical and Signaling Interface (FC-PH) published by the American National Standards Institute.

* cited by examiner

SYSTEM AND METHOD FOR PROVIDING PERSISTENT NODE NAMES

FIELD OF THE INVENTION

The present invention relates to storage systems and, particularly to storage systems operating on a Fibre Channel network.

BACKGROUND OF THE INVENTION

A storage system is a computer that provides storage service relating to the organization of information on writable persistent storage devices, such as memories, tapes or disks. The storage system is commonly deployed within a storage area network (SAN) to or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network to File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Fibre Channel is a set of related protocols that defines a transport mechanism for data over a network. Each Fibre Channel device (e.g., a storage adapter) connected to a network has a world wide name (WWN) comprising a node name. Typically, the node name is hard wired into the device so that it may not be modified. As each device connected to a Fibre Channel network has a unique node name, this hard encoding of the node name prevents duplicate node names from appearing on the same Fibre Channel switching fabric, which can lead to routing errors and data loss.

A noted disadvantage of the conventional hard encoding of the node name is that should a storage system be replaced, the clients of that system need to update their internal contact information as the new storage system will have a different node name. Similarly, if a storage system that is serving data to a set of original clients is taken offline and then reactivated, but with a differing set of volumes of data, the original clients may subsequently direct data access requests to the incorrect storage system. A "volume" is a cluster of physical storage devices that define an overall logical arrangement of storage space. Furthermore, if storage systems are configured as partners of a cluster and a failover situation arises such that a functioning cluster partner assumes control of the disks and manages data access requests of a failed cluster partner, a new node name will appear to be associated with that failed partner. Such a failover situation is described in U.S. Pat. No. 7,260,737, entitled SYSTEM AND METHOD FOR TRANSPORT-LEVEL FAILOVER OF FCP DEVICES IN A CLUSTER, by Arthur Lent, et al., issued on Aug. 21, 2007, the contents of which are hereby incorporated by reference.

The disadvantages described above are more noticeable when individual network interface controllers (NICs) or host bus adapters (HBAs) of a given storage system are replaced or swapped. As node names are often assigned to certain HBAs or NICs, the changing of a HBA/NIC results in a modified node name for a given storage system. A similar problem arises when a HBA/NIC is then moved from an original storage system to a second storage system. Clients of the original storage system thereafter direct their data access requests to the second storage system, which is not adapted to accept or process these data access requests.

Thus, use of conventional, hard-coded, WWNs as node names in various network configurations may result in additional client-side configuration issues to manage in order to permit the clients to continue to properly access data stored on a storage system. Such client-side configuration is rather burdensome and, therefore, undesirable.

SUMMARY OF THE INVENTION

The disadvantages of the prior art are overcome by providing a system and method for providing persistent node names in a storage system. By "persistent" it is meant node names that do not change when storage system hardware is removed and/or modified. To enable modifications or changes to its hardware configuration, the storage system records the node name in the root volume of the storage system. The root volume of the storage system is the principal volume associated with the storage system. This node name, which in one embodiment of the present invention is generated from the storage system's Non-Volatile Random Access Memory (NVRAM) serial number, is programmed into the HBA or NIC of the storage system.

By storing the node name in the root volume of the storage system, any of the hardware associated with the storage system, except the root volume, may be replaced or modified without affecting the node name associated with the storage system. This enables clients of a storage system to continue to access the storage system by using the persistent node name without referring to its internal routing/directory information.

Upon initialization, the storage system searches for a node name stored in its root volume. This node name may be, for example, stored in a configuration file located within the root volume. Upon discovering the node name, the storage system sets its node name to the discovered Node name and continues with its initialization process. However, if the storage system does not find a node name in the root volume, it generates a WWN/node name based on the NVRAM serial number. The generated WWN/node name is then set to the storage system's node name and is stored in the root volume for later use.

Alternately, and upon logging into a Fibre Channel (FC) switching fabric, a storage system connects to a FC name server to determine whether there is a conflicting node name connected to the switching fabric. If there is a conflicting node name connected to the switching fabric, then the storage system disconnects from the fabric and alert an administrator that there is an error condition. If there is no conflict, the storage system proceeds with its normal initialization routine.

BRIEF DESCRIPTION OF THE DRAWINGS

The above and further advantages of the invention may be better understood by referring to the following description in conjunction with the accompanying drawings in which like-reference numerals indicate identically or functionally similar elements, of which.

DETAILED DESCRIPTION OF AN ILLUSTRATIVE EMBODIMENT

A. Network Environment

Figure 1:
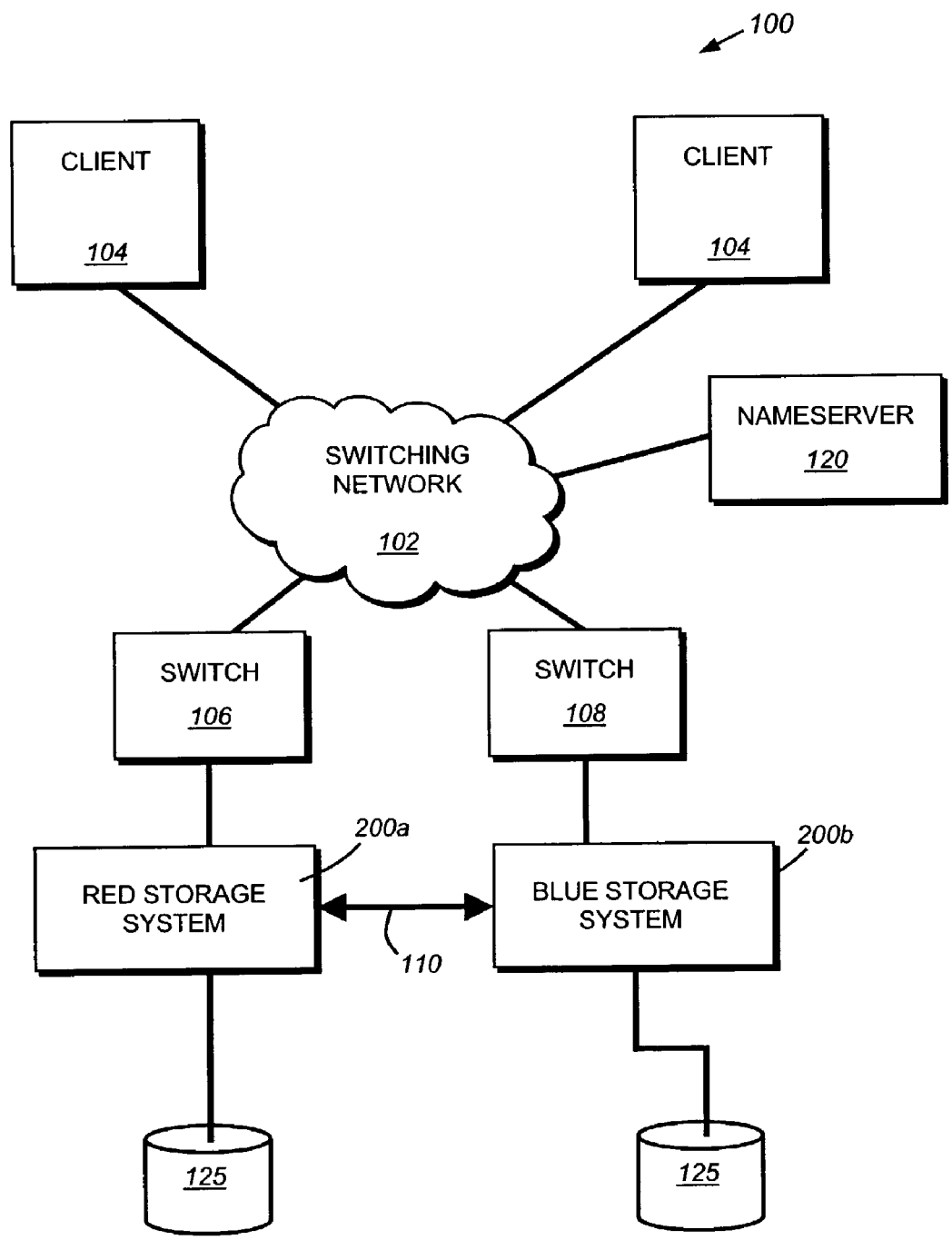
FIG. 1 is a schematic block diagram of an exemplary network environment in accordance with an embodiment of the present invention.

FIG. 1 is a schematic block diagram of an exemplary network environment 100 in which the principles of the present invention are implemented. The network 100 is based around a network cloud 102 configured as, e.g., a Fibre Channel (FC) switching network. FC is a set of related standards defining a transport service for a variety of data access protocols. Attached to the network cloud are a number of switches, 106 and 108, which connect to various FC devices, such as Red storage system 200 and Blue storage system 200. A number of clients 104 are also interconnected with the network cloud.

A client 104 may be a general-purpose computer, such as a PC or a workstation, or a special-purpose computer, such as an application server, configured to execute applications over an operating system that includes block access protocols. In this illustrative embodiment, Red storage system 200 and Blue storage system 200 are connected as two nodes of a storage system cluster. These storage systems, described further below, are storage appliances configured to control storage of, and access to, interconnected storage devices. Connected to each of the storage systems 200 is one or more storage devices 125 that form a root volume of the storage system. The root volume of a storage system is the principal volume associated with a given storage system. In the illustrative embodiment, the storage system stores its configuration information in its root volume. Each of the devices attached to the switching network 102 includes an appropriate conventional network interface arrangement (not shown) for communicating over the switching network 102, or through the switches 106 and 108, using a set of desired block access protocols such as Small Computer System Interface (SCSI) encapsulated over Fibre Channel (FCP).

Also connected to the switching network 102 is a FC Nameserver 120. The Nameserver 120 is a special-purpose server adapted to track node names connected to the switching network 102. The nameserver also responds to inquiry commands from devices connected to the FC switching network.

Connecting the Red and Blue storage systems 200 is a cluster interconnect 110, which provides a direct communication link between the two storage systems. The cluster interconnect can be of any suitable communication medium, including, for example, an Ethernet connection.

It should be noted that the storage systems 200 are shown in a cluster configuration for exemplary purposes only. The teachings of the present invention may be utilized when the storage systems are configured in any network configuration, including, for example, a single storage system connected to a Fibre Channel switching network.

B. Storage Appliance

Figure 2:
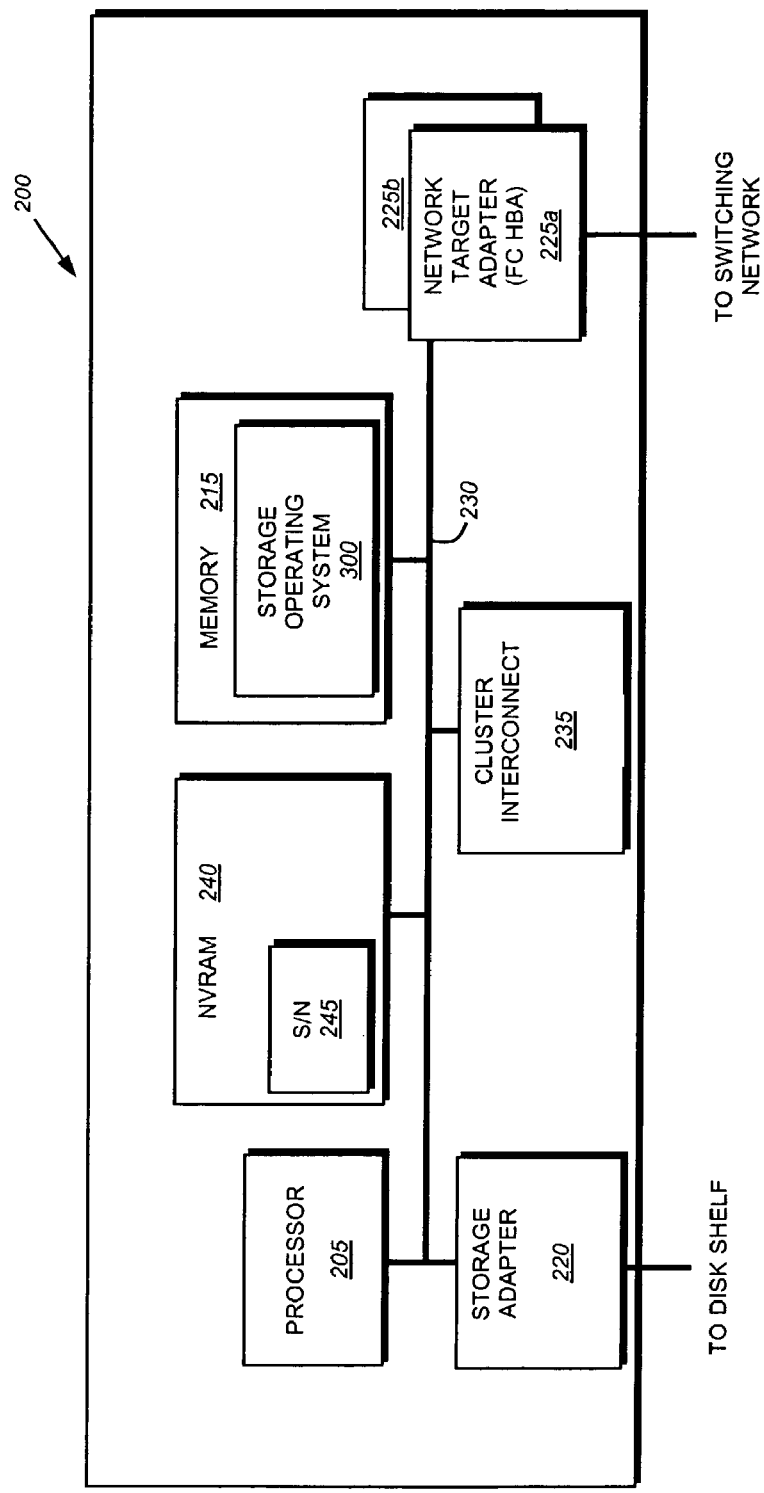
FIG. 2 is a schematic block diagram of an exemplary storage system in accordance with an embodiment of the present invention.

FIG. 2 is a schematic block diagram of an exemplary storage system 200 as used in network environment 100 configured to provide storage service relating to the organization of information on storage devices, such as disks. The storage system 200 is illustratively embodied as a multi-protocol storage appliance comprising a processor 205, a memory 215, a plurality of network adapters 225a, 225b and a storage adapter 220 interconnected by a system bus 230. A multi-protocol storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Multi-protocol storage appliances are further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., now published as U.S. Patent Publication No. 2004/0030668 A1 on Feb. 12, 2004, the teachings of which are hereby incorporated by reference. The terms "storage system" and "storage appliance" are thus used interchangeably. The storage appliance 200 also includes a storage operating system 300 that provides a virtualization system that logically organizes the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of logical unit numbers (luns) or vdisk objects. A vdisk object (hereinafter "vdisk") is a special file type that is implemented by the virtualization function and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Feb. 12, 2004, the contents of which are incorporated herein by reference. The multi-protocol storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225*a* and *b* couple the storage appliance to a plurality of clients over point-to-point links, wide area networks (WAN), virtual private networks (VPN) implemented over a public network (Internet) or a shared local area network (LAN) or any other acceptable networking architecture.

The network adapters 225*a*, *b* also couple the storage appliance 200 to a plurality of clients 104 that may be further configured to access the stored information as blocks or disks. For this SAN-based network environment, the storage appliance is coupled to an illustrative Fibre Channel (FC) switching network 102. The network adapters 225 may comprise a FC host bus adapter (HBA) having the mechanical, electrical and signaling circuitry needed to connect the storage appliance 200 to a SAN network switch, such as a conventional FC switch. In addition to providing FC access, the FC HBA may offload Fibre Channel network processing operations from the storage appliance's processor.

The clients may be general-purpose computers configured to execute applications over a variety of operating systems, including the UNIX® and Microsoft® Windows™ operating systems.

The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol.

In accordance with the FC protocol, initiators and targets have three unique identifiers, a node name, a port name and a device identifier. The node name and port name are "worldwide" unique. A device identifier is assigned dynamically by the FC port that it is attached to and is unique within a given FC switching fabric. In accordance with the Fibre Channel specification, a node name is a 8 byte long value that identifies each device connected to a Fibre Channel switching network. Node names are further described in ANSI Standard X3.230-1994 for Fibre Channel Physical and signaling Interface (FC-PH), the contents of which are hereby incorporated by reference. Each device connected to a Fibre Channel switching network logs into the network using its world wide unique node name.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225*a* and *b*, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage system 200 also includes a Non-Volatile Random Access Memory (NVRAM) 240. The NVRAM is used, during normal storage system operation, for various data integrity functions. The NVRAM 240 also includes, in the illustrative embodiment, a serial number 245 that uniquely identifies each storage system.

C. Storage Operating System

In the illustrative embodiment, the storage operating system is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
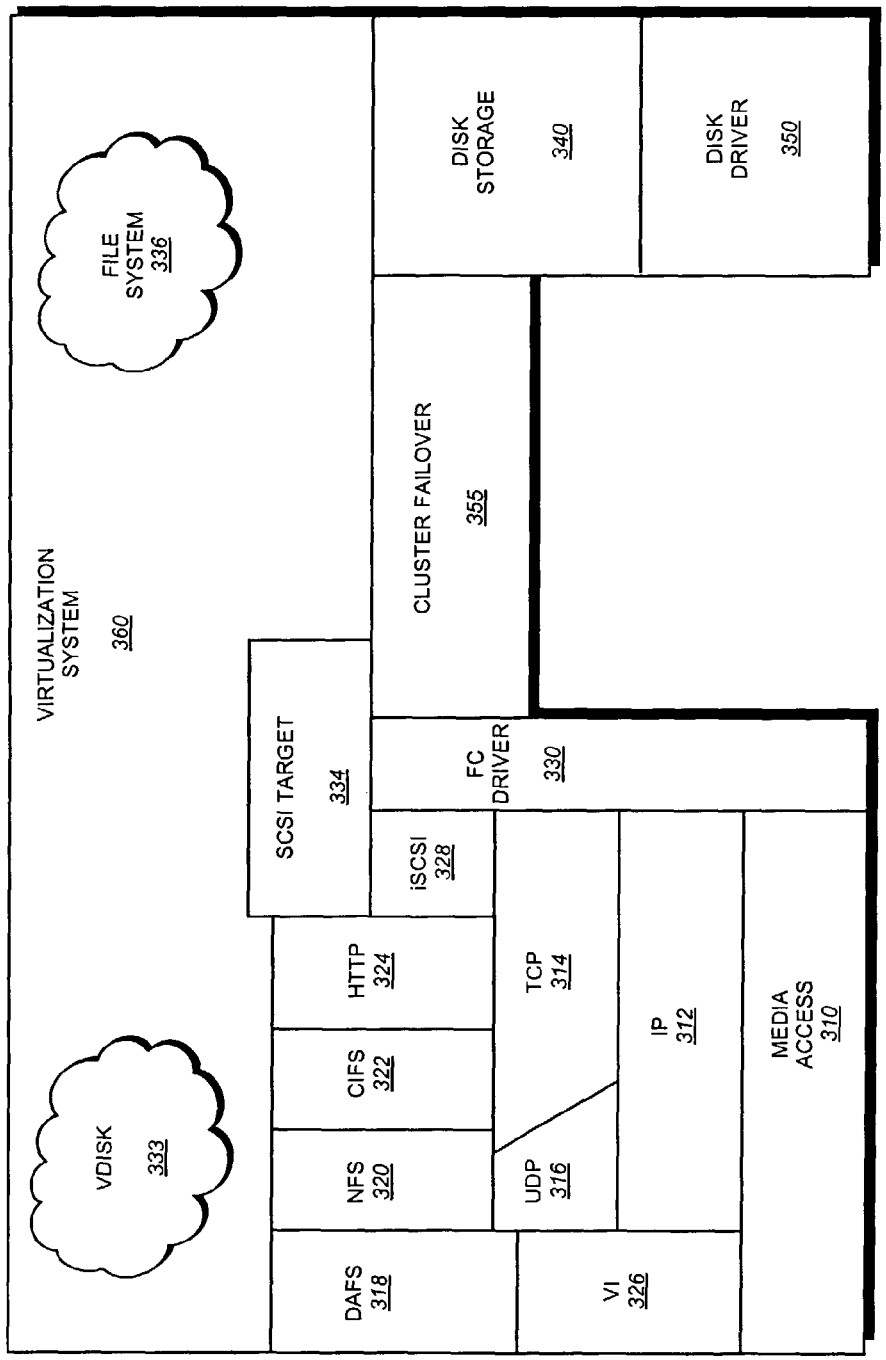
FIG. 3 is a schematic block diagram of an exemplary storage operating system in accordance with an embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a Redundant Array of Independent Disks (RAID) protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., a vdisk module 333 and SCSI target module 334. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks. It should be noted that the SCSI target module 334 and file system 336 may be implemented as hardware, software, firmware or any combination thereof.

The SCSI target module 334, in turn, initiates emulation of a disk or lun by providing a mapping procedure that translates luns into the special vdisk file types. The SCSI target module is illustratively disposed between the iSCSI and FC drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (kB) blocks and using inodes to describe the files. A further description of the structure of the file system, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

The storage operating system 300 further includes, in the illustrative embodiment, a cluster failover layer 355 that implements various failover features including initiating a failover. The cluster failover layer 355, in the illustrative embodiment, monitors the cluster interconnect for heartbeat signals.

D. Persistent Node Names

In accordance with the Fibre Channel specification, a device connected to the Fibre Channel switching network utilizes its node name when logging into the FC network. Thus, during the initialization procedure of a storage system and before the storage logs into the FC network, the node name is assigned. In accordance with the present invention, node names remains persistent across hardware changes to a storage appliance serving a specific set of resources. The storage appliance illustratively stores its node name in a predetermined location of the root volume associated with the storage, appliance. The node name may be stored in a special configuration file located within the root volume or may, in alternate embodiments, be appended to another storage appliance configuration file located within the root volume.

Figure 4:
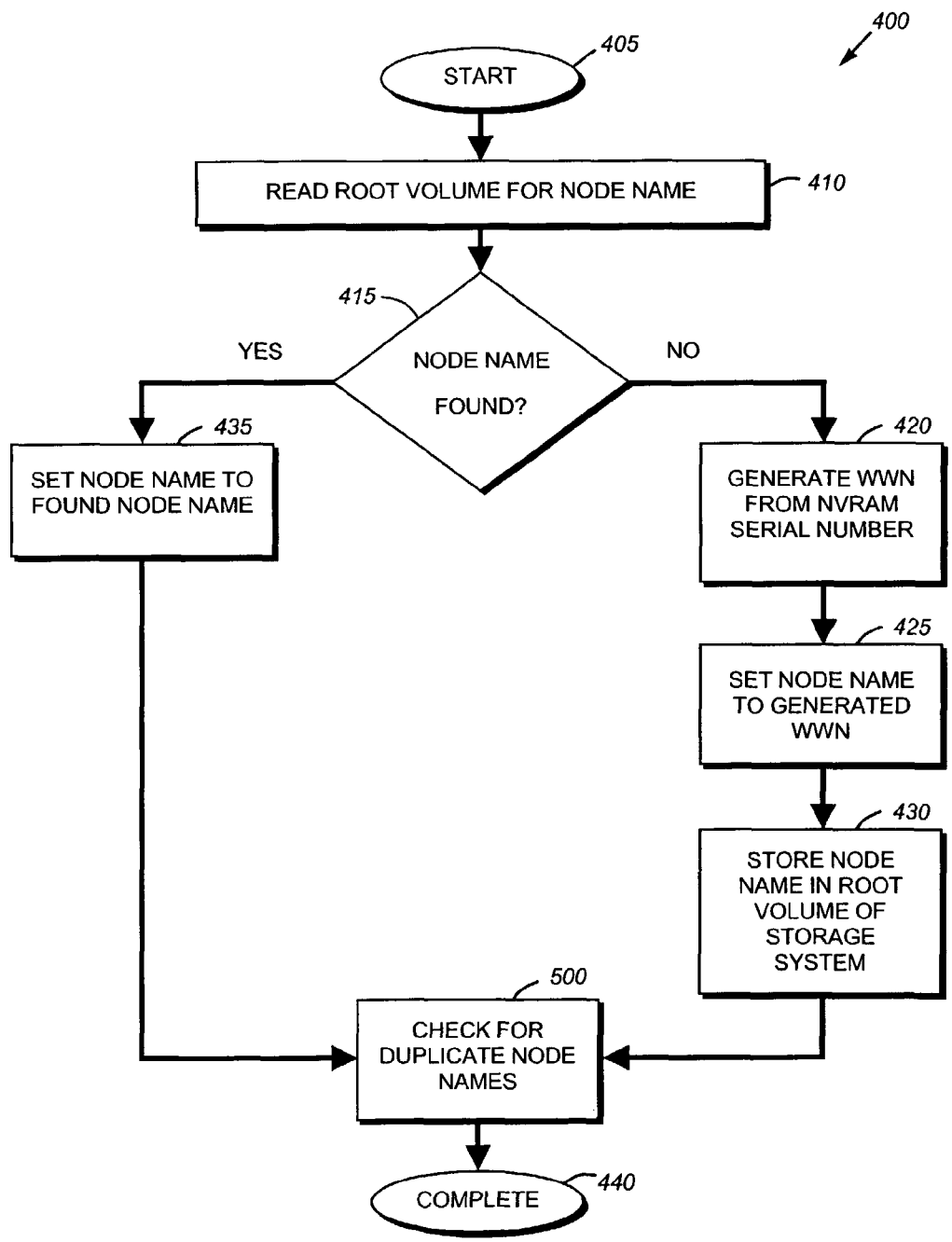
FIG. 4 is a flow chart of the steps of a procedure for setting a storage system's node name in accordance with an embodiment of the present invention.

FIG. 4 is a flowchart showing the steps for a procedure 400 performed by a storage appliance during its initialization process when utilizing an embodiment of the present invention. The procedure 400 initially starts in step 405 and then proceeds to step 410 where the storage appliance reads the root volume for a node name. This node name may be stored in a special configuration file within the root volume or, in alternate embodiments, be appended to a configuration file associated with the storage appliance. In another embodiment, the node name may be stored in a predetermined sector of the root volume. In step 415 the procedure determines if a proper node name, i.e., a node name of the appropriate form, was found. If no node name was found, then the storage appliance generates a WWN from the NVRAM serial number of the storage appliance (step 420). It should be noted that alternate methods of generating a WWN, such as utilizing a pseudorandom number generator, may be implemented in accordance with alternate embodiments of the present invention. The use of the storage appliance's NVRAM serial number is shown for exemplary purposes only. In step 425, the generated WWN is set as the node name of the storage system using, e.g., conventional HBA interface application program interface (API) calls. In step 430, the storage system stores the node name in the predetermined location of root volume of the storage system. For example, the node name is stored in the appropriate configuration file in accordance with the configuration scheme utilized for the given storage system.

If however the storage system determines that it has located a node name in step 415, the procedure then branches from step 415 to step 435 where the node name of the storage system is set to the node name that was found in the root volume. After the procedure 400 has either set the storage appliance's node name to a found node name in step 435 or has stored the node name generated in step 420 in the root volume of the storage system in step 430, the procedure proceeds to step 500 where the storage system checks for duplicate Node names in the FC switching fabric. Once this check for duplicate node names has been completed, the procedure is then complete (step 440).

Figure 5:
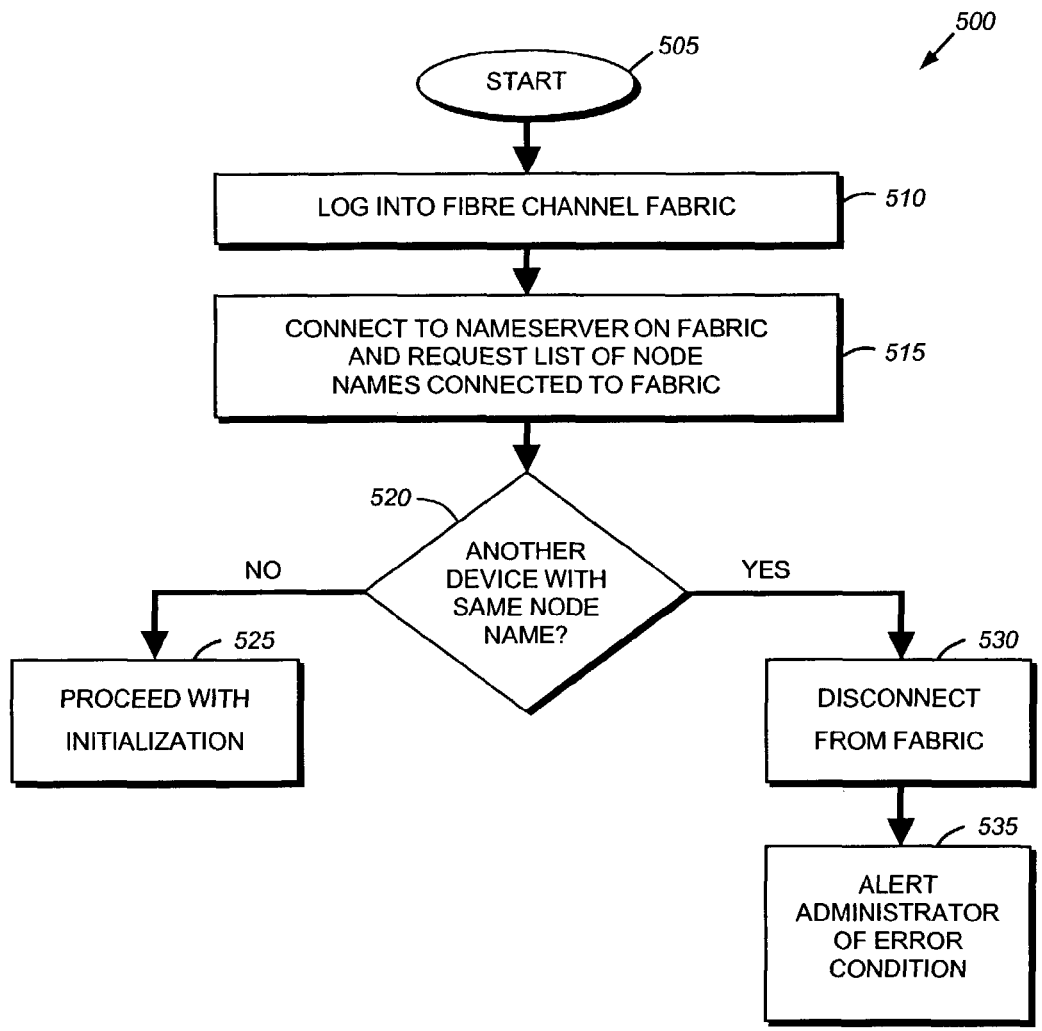
FIG. 5 is a flow chart detailing the steps of a procedure for determining whether a duplicate node name is connected to a switching fabric in accordance with an embodiment of the present invention.

FIG. 5 is a flow chart of the steps of a procedure 500 for ensuring that multiple devices with the same node name do not connect to the same Fibre Channel switching fabric. The procedure begins in step 505 and then proceeds to step 510 where the storage appliance logs into the Fibre Channel switching fabric using, e.g., conventional. Fibre Channel switching fabric protocol routines. The storage appliance then, in step 515, connects to a name server (such as Nameserver 120) connected to the Fibre Channel switching fabric and requests a list of node names that are connected to the fabric. In certain Fibre Channel configurations, the name server may track the node names of the devices connected to the switching fabric. By utilizing conventional Fibre Channel protocol commands, a device may request a list of node names connected to a given FC switching fabric from the nameserver. Once a storage appliance has received the list of node names from the name server, the storage appliance then determines if another device with the same node name is connected to the fabric (step 520). If there is no other device with the same node name connected to the fabric, the procedure then branches to step 525 and the storage appliance proceeds with its conventional initialization procedure.

Otherwise, if another device is connected to the switching fabric with the same node name, the procedure branches to step 530 where the storage appliance disconnects from FC switching fabric. The storage appliance then, in the illustrative embodiment, alerts the administrator of the error condition in step 535. The storage appliance may send an alert message to the administrator via, for example email or may display an error message in a graphical user interface (GUI).

Even if a storage appliance logs into a Fibre Channel switching network and does not detect another device with its same node name, it is possible for multiple devices to be connected to the switching fabric and utilize the same node name. For example a second storage system that does not utilize the teachings of the present invention may be connected to the switching fabric. This new storage system may utilize the same node name as a storage system already connected to the Fibre Channel switching fabric. In such an occurrence, multi protocol storage appliances typically utilize lun masking or lun mapping to limit access, e.g., prevent an unauthorized client from accessing data contained in volumes or vdisks associated with a given storage appliance.

To again summarize, the present invention provides a system and method for enabling persistent node names to be associated with a storage system. In the illustrative embodiment, the storage system, during the initialization routine, checks the root volume of the storage system to identify a node name to use. If a node name is located in a configuration file or otherwise stored in the root volume, the storage appliance then utilizes that stored node name. This enables complete storage systems, or components thereof, to be modified, replaced, or changed without a resulting change in the node name associated with the storage system.

It should be noted that the teachings of the present invention may be utilized with protocols other than Fibre Channel. It is expressly contemplated that the teachings of the present invention may be embodied with any protocol that utilizes one or more world wide unique identifiers for each device connected to the network. As such, the term "node name" should be taken to include any form of world wide unique network identification for use within any acceptable network transport protocol. For example, the teachings of the present invention could be used to provide persistent port names in a FC environment.

The foregoing description has been directed to specific embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for providing a persistent node name to a storage system of a computer network, comprising:
   searching for a node name stored in a root volume of the storage system by reading a configuration file stored in the root volume;
   in response to not finding the node name in the configuration file, generating a new node name, storing the new node name in the configuration file as the persistent node name of the storage system, and setting the new node name to the persistent node name of the storage system; and
   in response to finding the node name stored in the configuration file, setting the node name found in the configuration file to the persistent node name of the storage system.

2. The method of claim 1 further comprising checking for a duplicate node name.

3. The method of claim 2 wherein checking for the duplicate node name comprises:
   wherein the computer network comprises a switching network;
   requesting, from a name server associated with the switching network, a list of node names connected to the switching network; and
   determining if another device exists on the switching network with the duplicate node name.

4. The method of claim 3 further comprising:
   disconnecting, in response to determining that another device exists on the switching network with the duplicate node name, from the switching network; and
   performing, in response to determining that another device does not exist on the switching network with the duplicate node name, an initialization routine.

5. The method of claim 3 wherein the switching network comprises a Fibre Channel switching network.

6. The method of claim 1 wherein setting the new node name comprises using one or more application programming interface (API) calls associated with a storage adapter of the storage system.

7. The method of claim 1 wherein generating the new node name comprises:
   obtaining a serial number associated with the storage system; and
   generating the new node name from the serial number associated with the storage system.

8. The method of claim 7 wherein obtaining the serial number comprises reading the serial number from a non-volatile random access memory associated with the storage system.

9. A computer implemented method for use with a switching network, comprising:
   connecting to the switching network;
   searching to locate a unique identifier in a root volume by reading a configuration file stored in the root volume associated with a computer;
   in response to not locating the unique identifier in the configuration file, generating a new unique identifier generated using persistent data found in the computer, and storing the new unique identifier in the configuration file as a persistent unique identifier of the computer, and setting the new unique identifier to the persistent unique identifier of the computer;
   in response to locating the unique identifier stored in the configuration file, setting the unique identifier to the persistent unique identifier of the computer; and determining whether another device connected to the switching network is utilizing a same unique identifier of the computer.

10. A method for providing a persistent node name to a storage system, comprising:
    searching for a node name stored in a configuration file stored in a root volume associated with the storage system, the node name identifying the storage system;
    in response to not finding the node name in the configuration file, generating a new node name from a serial number associated with the storage system, storing the new node name in the configuration file as the persistent node name, and setting the new node name to the persistent node name;
    in response to finding the node name in the configuration file, setting the node name found in the configuration file to the persistent node name; and
    checking for a duplicate node name.

11. The method of claim 10 wherein checking for the duplicate node name comprises:
    connecting the storage system to a Fibre Channel network;
    requesting, from a name server associated with the Fibre Channel network, a list of node names connected to the Fibre Channel network; and
    determining if another device exists on the Fibre Channel network with the duplicate node name.

12. A method for providing a persistent node name to a storage system connected to a Fibre Channel switching network, comprising:
    searching for a node name stored in a configuration file stored in a root volume associated with the storage system;
    in response to not finding the node name in the configuration file, generating a new node name for use as the persistent node name by the storage system utilizing a serial number associated with the storage system;
    in response to finding the node name in the configuration file, setting the node name to the persistent node name found in the configuration file;
    connecting to the Fibre Channel switching network;
    requesting, from a name server associated with the Fibre Channel switching network, a list of node names connected to the Fibre Channel switching network;
    determining if another device exists on the Fibre Channel switching network with a duplicate node name;
    disconnecting, in response to identifying another device connected to the Fibre Channel switching network that has the duplicate node name, from the Fibre Channel switching network;
    performing, in response to not finding another device connected to the Fibre Channel switching network with the duplicate node name, an initialization routine for the storage system; and
    replacing any hardware of the storage system except hardware comprising the root volume, wherein replacing the any hardware does not change the persistent node name associated with the storage system.

13. A non-transitory computer-readable storage medium containing executable program instructions executed by a processor, comprising:
    program instructions that search for a unique identifier stored in a configuration file stored in a root volume of a storage system;

program instructions that, in response to not finding the unique identifier in the configuration file, generate a new unique identifier, program instructions that store the new unique identifier in the configuration file as a persistent unique identifier of the storage system, and program instructions that set the new unique identifier to the persistent unique identifier of the storage system; and program instructions that, in response to finding the unique identifier in the configuration file, set the unique identifier found in the configuration file to the persistent unique identifier of the storage system.

14. The non-transitory computer-readable storage medium of claim 13 wherein the unique identifier comprises a node name.

15. The non-transitory computer-readable storage medium of claim 13 further comprising program instructions that implement the unique identifier in a switching network.

16. The non-transitory computer-readable storage medium of claim 13 further comprising:

program instructions that check for a duplicate unique identifier; and program instructions that, in response to finding the duplicate unique identifier, generate an error message.

17. The non-transitory computer-readable storage medium of claim 13 further comprising program instructions that use a serial number in the computer to generate the new unique identifier.

18. The non-transitory computer-readable storage medium of claim 13 further comprising program instructions that use a serial number of a NVRAM in the computer to generate the new unique identifier.

19. The computer implemented method of claim 9 wherein setting the new unique identifier comprises using one or more application programming interface (API) calls associated with a storage adapter of the computer.

20. The computer implemented method of claim 9 further comprising locating a serial number in the computer used as the persistent data found in the computer.

21. The computer implemented method of claim 9 further comprising locating a serial number of a NVRAM in the computer as the persistent data found in the computer.

22. A method for providing a persistent node name to a storage system connected to a switching network, comprising:

searching for a node name stored in a configuration file stored in a root volume associated with the storage system;

in response to not finding the node name in the configuration file, generating a new node name for the storage system by utilizing a serial number associated with a NVRAM of the storage system;

storing the persistent node name in the configuration file as the persistent node name;

setting the new node name to the persistent node name;

in response to finding the node name in the configuration file, setting the node name to the persistent node name in the configuration file; and replacing any hardware of the storage system except hardware comprising the root volume, wherein replacing the any hardware does not change the persistent node name associated with the storage system.

* * * * *

UNITED STATES PATENT AND TRADEMARK OFFICE
CERTIFICATE OF CORRECTION

| | | |
|---|---|---|
| PATENT NO. | : 8,015,266 B1 | Page 1 of 1 |
| APPLICATION NO. | : 10/360434 | |
| DATED | : September 6, 2011 | |
| INVENTOR(S) | : Herman Lee | |

It is certified that error appears in the above-identified patent and that said Letters Patent is hereby corrected as shown below:

In Col. 1, line 16 should read:
    area network (SAN) ~~to~~ or a network attached storage (NAS)

In Col. 1, line 54 should read:
    tional Common Internet File System (CIFS), the Network ~~to~~

Signed and Sealed this
Twenty-fourth Day of April, 2012

David J. Kappos
*Director of the United States Patent and Trademark Office*